(12) United States Patent
Wykydal

(10) Patent No.: US 9,782,795 B2
(45) Date of Patent: Oct. 10, 2017

(54) METHOD FOR COATING A PUMP COMPONENT

(71) Applicant: HYDAC DRIVE CENTER GMBH, Langenau (DE)

(72) Inventor: Bernd Wykydal, Giengen (DE)

(73) Assignee: HYDAC DRIVE CENTER GMBH, Langenau (DE)

( * ) Notice: Subject to any disclaimer, the term of this patent is extended or adjusted under 35 U.S.C. 154(b) by 0 days.

(21) Appl. No.: 14/888,485

(22) PCT Filed: Apr. 30, 2014

(86) PCT No.: PCT/EP2014/001166
§ 371 (c)(1),
(2) Date: Nov. 2, 2015

(87) PCT Pub. No.: WO2014/187531
PCT Pub. Date: Nov. 27, 2014

(65) Prior Publication Data
US 2016/0167088 A1    Jun. 16, 2016

(30) Foreign Application Priority Data

May 22, 2013 (DE) .......... 10 2013 008 629
May 22, 2013 (DE) .......... 10 2013 008 676
(Continued)

(51) Int. Cl.
*B05D 5/08* (2006.01)
*F01B 3/10* (2006.01)
(Continued)

(52) U.S. Cl.
CPC .............. *B05D 5/08* (2013.01); *B05D 3/002* (2013.01); *B05D 3/0254* (2013.01); *B05D 3/12* (2013.01);
(Continued)

(58) Field of Classification Search
None
See application file for complete search history.

(56) References Cited

U.S. PATENT DOCUMENTS 4,758,404 A    7/1988 Muto
2005/0069448 A1    3/2005 Sato et al.
(Continued)

FOREIGN PATENT DOCUMENTS

DE    28 29 597    9/1988
DE    102 35 813    7/2004
(Continued)

OTHER PUBLICATIONS

International Search Report (ISR) dated Aug. 26, 2014 in International (PCT) Application No. PCT/EP2014/001166.

*Primary Examiner* — Michael P Rodriguez
(74) *Attorney, Agent, or Firm* — Wenderoth, Lind & Ponack, L.L.P.

(57) ABSTRACT

A method for coating a pump component (23, 31), in particular, a part of an axial piston pump (7), having the steps of providing a blank of the component (23, 31), providing at least one recess in the blank, filling a powdery coating material into the associated recess, melting the coating material under a protective gas atmosphere and material-removing processing of the blank to form at least one sliding and/or bearing surface (6) from the coating.

10 Claims, 4 Drawing Sheets

(30) Foreign Application Priority Data

| May 22, 2013 | (DE) | 10 2013 008 677 |
|---|---|---|
| May 22, 2013 | (DE) | 10 2013 008 678 |
| May 22, 2013 | (DE) | 10 2013 008 679 |
| May 22, 2013 | (DE) | 10 2013 008 681 |

(51) Int. Cl.

| *F03C 1/40* | (2006.01) |
|---|---|
| *F04B 1/12* | (2006.01) |
| *F04B 1/20* | (2006.01) |
| *F04B 1/30* | (2006.01) |
| *F04B 1/32* | (2006.01) |
| *F04B 49/08* | (2006.01) |
| *F04B 53/14* | (2006.01) |
| *F03C 1/28* | (2006.01) |
| *C23C 24/10* | (2006.01) |
| *F16C 33/14* | (2006.01) |
| *F04B 11/00* | (2006.01) |
| *B05D 3/00* | (2006.01) |
| *B05D 3/02* | (2006.01) |
| *B05D 3/12* | (2006.01) |
| *F04B 1/14* | (2006.01) |
| *F04B 19/22* | (2006.01) |
| *F04B 1/22* | (2006.01) |

(52) U.S. Cl.
CPC ............ *C23C 24/106* (2013.01); *F01B 3/106* (2013.01); *F03C 1/0605* (2013.01); *F03C 1/0686* (2013.01); *F04B 1/124* (2013.01); *F04B 1/126* (2013.01); *F04B 1/146* (2013.01); *F04B 1/2035* (2013.01); *F04B 1/2064* (2013.01); *F04B 1/2071* (2013.01); *F04B 1/2078* (2013.01); *F04B 1/2085* (2013.01); *F04B 1/2092* (2013.01); *F04B 1/22* (2013.01); *F04B 1/303* (2013.01); *F04B 1/32* (2013.01); *F04B 1/324* (2013.01); *F04B 11/0091* (2013.01); *F04B 19/22* (2013.01); *F04B 49/08* (2013.01); *F04B 53/14* (2013.01); *F16C 33/14* (2013.01); *F16C 2204/34* (2013.01); *F16C 2223/46* (2013.01); *F16C 2360/00* (2013.01)

(56) References Cited

U.S. PATENT DOCUMENTS

| 2005/0258147 | A1 | | 11/2005 | Donders |
|---|---|---|---|---|
| 2010/0068054 | A1 | * | 3/2010 | Tollner .................. F04D 17/168 |
| | | | | 415/229 |

FOREIGN PATENT DOCUMENTS

| DE | 601 18 246 | | 3/2007 |
|---|---|---|---|
| DE | 10 2008 027 698 | | 12/2009 |
| DE | 10 2008 027 700 | | 12/2009 |
| DE | 10 2011 053 423 | | 2/2013 |
| DE | 10 2011 053423 | * | 2/2013 |
| EP | 2 281 654 | | 2/2011 |
| EP | 2 327 490 | | 6/2011 |
| WO | 2004/015286 | | 2/2004 |
| WO | 2009/129820 | | 10/2009 |

* cited by examiner

METHOD FOR COATING A PUMP COMPONENT

FIELD OF THE INVENTION

The invention relates to a method for coating a pump component, in particular, a part of an axial piston pump.

BACKGROUND OF THE INVENTION

Modern designed pumps, as they are used, for example, in hydraulic systems in the form of axial piston pumps, include components having surface areas that are highly stressed during operation. To ensure reliable operation over long operating periods, relevant components, at least on the highly stressed areas, are conventionally provided with a coating. The coating gives the relevant component the desired surface characteristics at the critical points. In particular, coated areas are intended to form sliding points or bearing points, which points enable a relative movement between the relevant component and a fixed pump component that is wear-resistant and low-friction.

SUMMARY OF THE INVENTION

An object of the invention is to present an improved method that permits the formation of a coating having particularly advantageous surface characteristics.

According to the invention, this object is basically achieved by a method comprising a soldering powder method for the coating, in which a powdery coating material is poured into a corresponding molded recess in the carrier material of the blank and melted therein. Melting occurs under a protective gas atmosphere and results in a soldered connection, such that the layer formed is inseparably bonded to the carrier material of the blank. To form a corresponding finished part, the blank is subsequently finished in a material-removing process, for example, machined by turning and/or milling.

To form a coating especially suitable for slide bearing points, a coating in the form of a bronze layer may be particularly advantageously formed, by filling the respective recess with powdery tin bronze CuSn6.

The blank is preferably roughly turned from steel, for example, carbon steel.

Melting may be particularly advantageously carried out without pressure in a vacuum furnace. In this way, the melting process takes place with no temperature differences between the steel and the bronze. Flaws, as these occur during molding, such as bonding flaws, solder cracks and the like, may be eliminated as a result.

A tempered state can be achieved through targeted cooling following melting. A tempered steel is preferably used as a blank material for this purpose, wherein tempered states in the range of 750 to 850 N/mm$^2$ may be achieved.

The method according to the invention is particularly suitable for forming a coating on a control plate and/or a guide shoe of an axial piston pump.

A control plate of an axial piston pump may be produced by advantageously producing a blank in the form of a circular disk having a central orifice. A recess in the form of an annular space may be formed on the blank between a projecting circumferential edge and an edge in the form of a projecting annular rib surrounding the orifice.

A guide shoe of an axial piston pump may be produced by producing a blank in the form of a circular cylindrical body. In the one cylinder surface of the body a recess in the form of an annular surface delimited by a projecting circumferential edge is formed.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
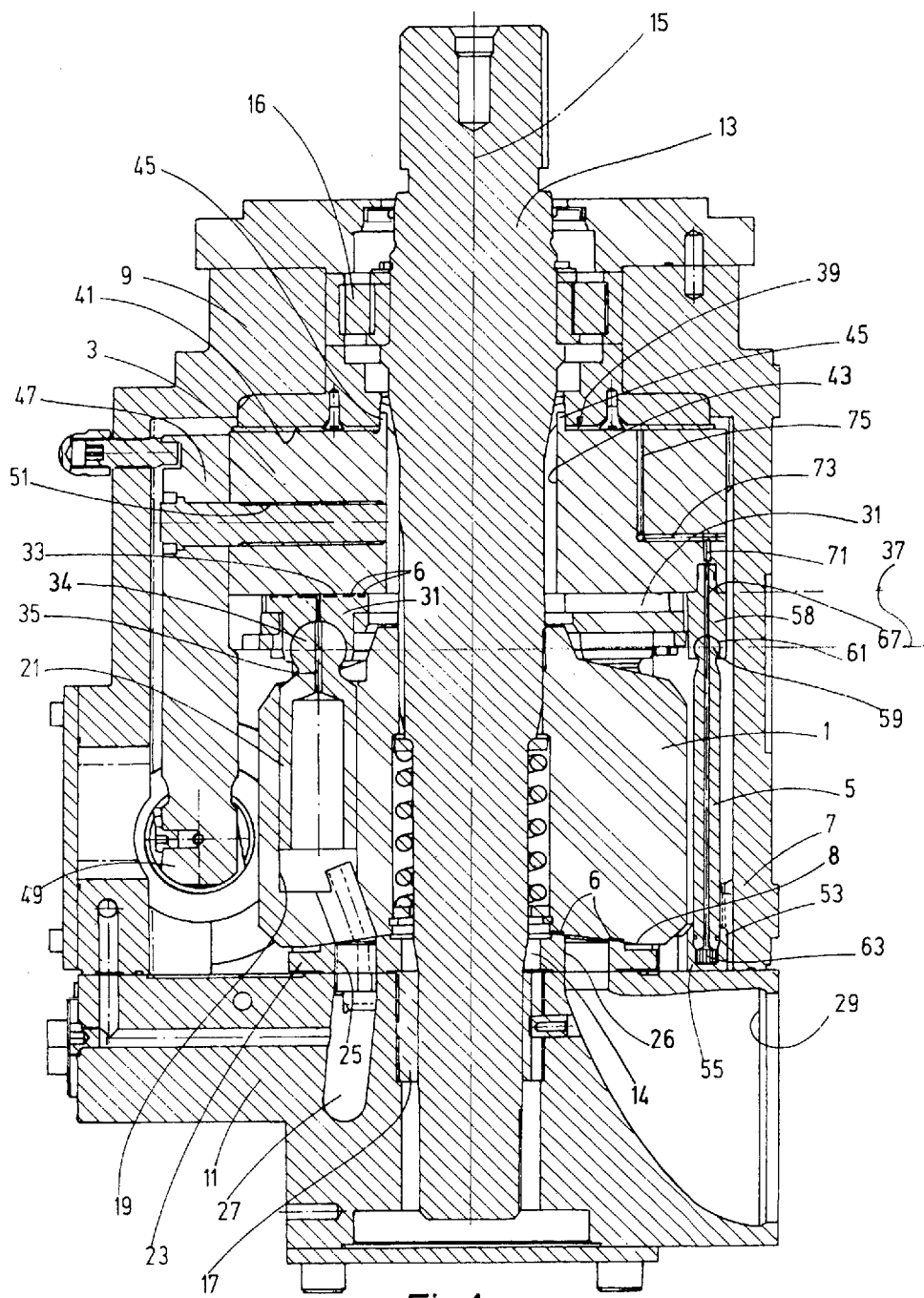
FIG. 1 is a side view in section of an axial piston pump having components, which have a coating produced in accordance with the method according to an exemplary embodiment of the invention.
Figure 2:
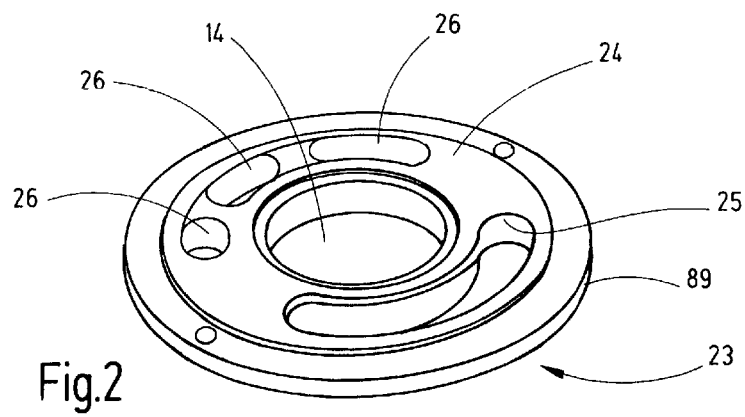
FIG. 2 is a perspective view of the control plate of the axial piston pump of FIG. 1, which is provided with a coating produced in accordance with the method according to an exemplary embodiment of the invention.
Figure 7:
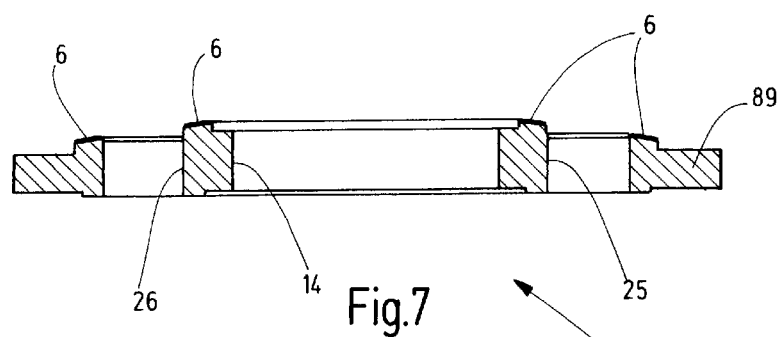
FIG. 7 is a side view in section of the finished control plate after final machining of the blank, which control plate is shown in the perspective view in FIG. 2.

FIG. 1 shows an axial piston pump of a swash plate design. The pump includes components that have a coating 24 produced in accordance with a method according to an exemplary embodiment of the invention. A rotating driveable cylindrical drum 1 is provided in a pump housing 7 in the manner conventional for axial piston pumps of this type. The cylindrical drum is attached to a swash plate 3, which may be pivoted for adjusting the output and, therefore, the system pressure producible by the pump, the pivot axis of the swash plate 3 being identified by numeral 37 in FIG. 1. The pump housing 7 includes an upper part 9 situated above in the drawing and a lower part 11. A drive shaft 13 for the cylindrical drum 1 is mounted in the upper part 9 in a tapered roller bearing 16 for rotational movement about the axis 15 and in the lower part 11 via a slide bearing 17. The cylinder chambers 19 of the cylindrical drum 1 with pistons 21 guided therein (in the section plane of FIG. 1 only one cylinder chamber 19 is visible) contact a control plate 23, in the drawing at the lower cylinder end, which control plate abuts the lower housing part 11. The control plate 23 has control openings 25 and 26 for connections between a connection 29 on the intake side and a connection 27 on the pressure side into the cylinder chambers 19 of the cylindrical drum 1. The control plate 23, depicted separately in FIG. 2 and FIG. 7, has a coating 24, see FIG. 2, on the upper side in the drawing facing the cylindrical drum 1. The coating is produced in accordance with a method according to the invention, and forms the bearing surface on which the slightly concavely curved bottom surface 8 of the cylindrical drum 1 slides as it rotates. In FIG. 7, parts 6 of the coating 24 form bearing points between a central orifice 14 and adjacent control openings 25 and 26.

As the cylindrical drum 1 moves, the pistons 21 slide past one guide shoe 31, each on the sliding surface 33 situated on the underside of the swash plate 3. A guide shoe 31 is depicted separately in FIG. 10. The guide shoes 31 are connected to the upper piston side of the associated piston 21 in a ball-joint manner. The ball joint is formed by a ball-shaped head 34 on the piston 21 and a ball socket 36 in the guide shoe 31. The ball joint is secured by a crimp 38 on the guide shoe 31. Oil bores 35 in the ball-shaped head 34 and guide shoe 31 form an access for fluid, such as hydraulic oil, for lubricating the sliding surface 33 and for hydrostatic release of the guide shoe. As in the case of the control plate 23, the guide shoes 31 also having a coating 24 produced in accordance with a method according to the invention.

As previously mentioned, the swash plate 3, to set the flow volume, is adjustable about the pivot axis 37, which lies in the plane of the sliding surface 33 of the swash plate 3. This pivot axis 37 is defined by the swash plate mounting formed between the swash plate 3 and the upper part 9. The mounting includes a plastic bearing shell 39 on the upper part 9, on which the swash plate 3 with a concave-shaped sliding surface 41 is guided. In the sliding surface 41, a passage opening 43 expanding conically upward is formed in the swash plate 3 to allow entry of the drive shaft 13. Guide rails 45 projecting from the sliding surface 41 are provided on both sides next to the opening 43 as part of the swash plate mounting. For pivotally moving the swash plate 3 about the pivot axis 37, the side of the swash plate 3 located to the left in FIG. 1 is screwed to a pivot lever 47. Pivot lever 47 extends parallel to the axis 15 next to the cylindrical drum 1 and is movable at its lower end 49 in FIG. 1, in a direction extending perpendicular to the drawing plane, in order to effect a corresponding pivotal movement of the swash plate 3 about the pivot axis 37. The pivot lever 47 is screwed to an inner thread situated in a bore 51 on the associated side of the swash plate 3.

A flexible tube 5 forming a component of a feed and pressure device is, as shown in FIG. 1, arranged laterally next to the cylindrical drum 1 in a direction extending parallel to the axis 15. The flexible tube 5 is seated at its lower end in FIG. 1 in a mount 53 in a connector block 55 on the lower housing portion 11. The mount 53 allows for an axial displacement of the flexible tube 5. The block 55 includes a connection channel to the pressure side 29, not visible in FIG. 1, which opens into the mount 53 of the flexible tube 5. The upper end of the flexible tube 5 is flexibly connected to the swash plate 3 via a connecting piece 58 arranged laterally outside of the sliding surface 33 on the underside of the swash plate 3. The flexible connection is realized by a type of ball joint and includes a ball-shaped head 59 at the upper end of the flexible tube 5, which is accommodated in a ball socket 61 of the connecting piece 58. The flexible tube 5 is braced via the connecting piece 58 against the swash plate 3. For this purpose, a disk spring set 63 is arranged between the lower end of the flexible tube 5 and the bottom of the mount 53. A fluid orifice 67 in the connecting piece 58 continues the fluid connection to the pressure side 29 beyond the tube opening on the ball-shaped head 59 to the swash plate 3. Adjoining the orifice 67 of the connecting piece 58 are lubrication channels 73, 75 formed within the swash plate 3, of which only some are visible in FIG. 1 and of which the vertical ducts 75 lead to the locations of the sliding surface 41 relevant for supplying lubricant for the swash plate mounting.

Figure 5:
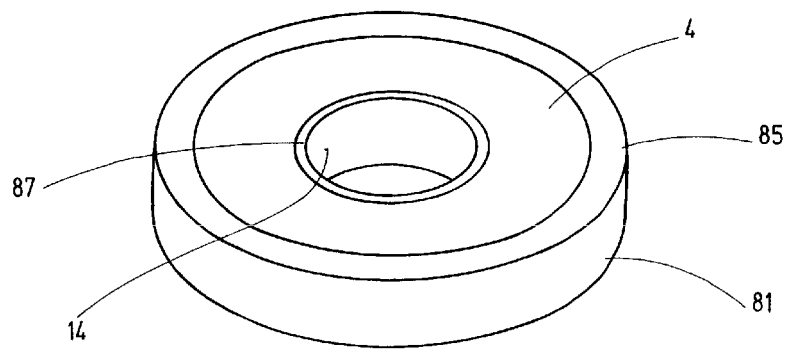
FIG. 5 is a perspective view of the blank of FIGS. 3 and 4, having a powdery coating material filled in the recess formed therein.
Figure 3:
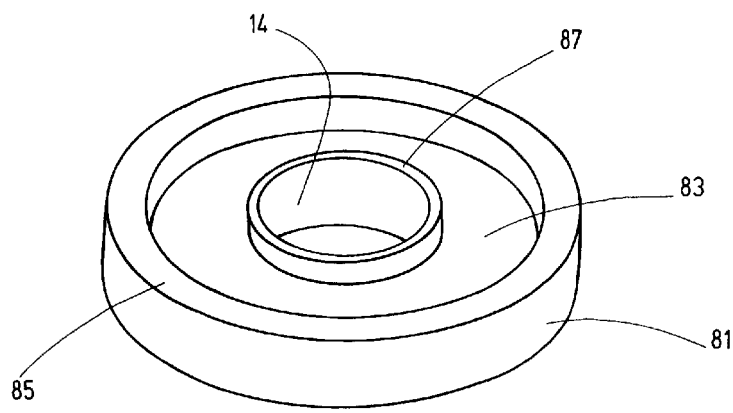
FIG. 3 is a perspective view of a blank, which is prefabricated for the production of the control plate of FIG. 2, coated in accordance with the method according an exemplary embodiment of to the invention.
Figure 4:
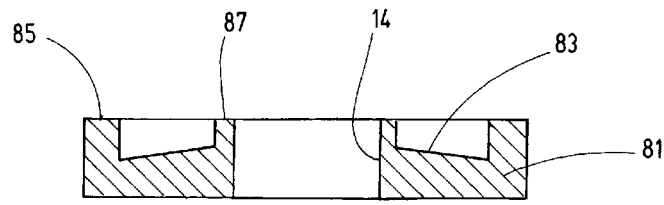
FIG. 4 is a side view in section of the blank of FIG. 3.
Figure 6:
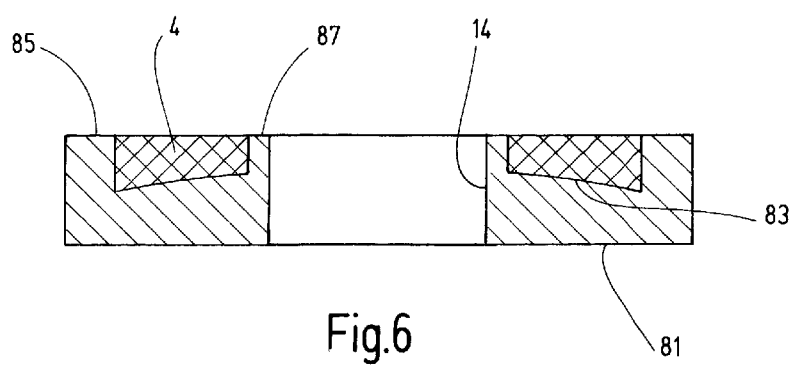
FIG. 6 is a side view in section of the blank of FIGS. 3 and 4 having a powdery coating material filled in the recess.

FIGS. 3 through 7 illustrate the steps of a method according to the invention for forming a coating 24 on the control plate 23 of the axial piston pump depicted in FIG. 1. FIG. 3 shows the form of a blank 81 produced from tempered steel as a rotating part in the form of a circular cylindrical disk having a circular recess 83 between a projecting circumferential edge 85 and a projecting annular rib 87 at the edge of the central orifice 14. As shown in FIG. 4, the recess 83 is consistently recessed in the radial direction (i.e., recess 83 continuously deepens in the radially outward direction). FIGS. 5 and 6 illustrate the further method step, in which the recess 83 is filled with the powdery coating material 4. To form the coating 24 in the form of a bearing bronze, a powdery tin bronze CuSn6 is filled in as the filler material. The coating material 4 is then melted under a protective gas atmosphere without pressure in a vacuum furnace. The bronze layer is inseparably bonded to the carrier part as a result of the soldered connection produced. A specific tempered state can be achieved through targeted cooling following the soldering process. FIG. 7 illustrates the finished state of the control plate 23, once the semi-finished product shown in FIGS. 5 and 6 is rendered in the form shown in FIG. 2 and FIG. 7 by turning. As is apparent, slide bearing regions 6 are formed from the coating 24 between the central orifice 14 and the control opening 25 on the intake side, and the control opening 26 on the pressure side, as well as between a flange-like circumferential region 89 and the control openings 25, 26, as they are identified in FIG. 7. The bearing region 6 formed from the coating 24 is convexly curved, corresponding to the slightly concavely curved bottom surface 8 of the cylindrical drum 1. The region 6 of the coating 24 is lapped together with the bottom surface 8 of the cylindrical drum 1.

Figure 10:
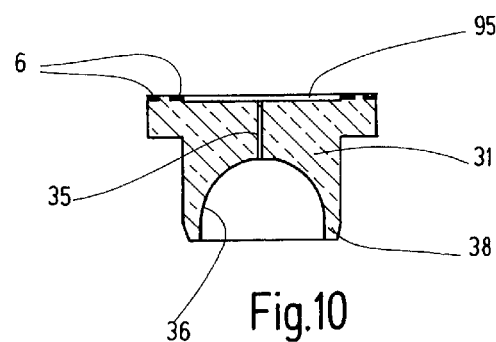
FIG. 10 is a side view in section of the finished guide shoe after final machining of the blank of FIG. 9.
Figure 8:
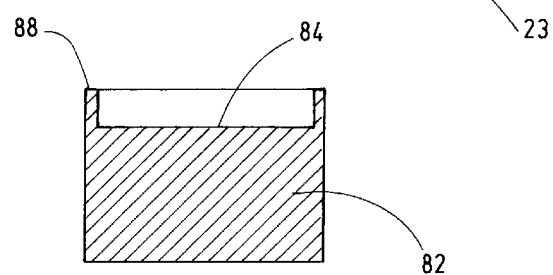
FIG. 8 is a side view in section of a blank for producing a guide shoe coated in accordance with the method according to an exemplary embodiment of the invention for the axial piston pump of FIG. 1.
Figure 9:
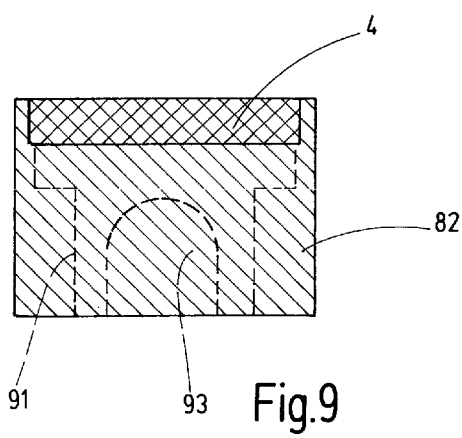
FIG. 9 is a side view in section of the blank of FIG. 8, having a powdery coating material filled in the recess formed.

FIGS. 8 through 10 illustrate the coating of a guide shoe 31 of the axial piston pump of FIG. 1 in accordance with a coating method according to the invention. Again, a steel blank 82 is roughly turned so as to form a recess 84 in the form of an annular surface bordered by a projecting circumferential edge 88, which is filled with the powdery coating material 4, again tin bronze. Melting then takes place as described in the example of the control plate 23. The semi-finished product formed after melting is depicted in FIG. 9. The guide shoe 31 is brought to final form as shown in FIG. 10 by subsequent final machining by turning and milling (some of the machining lines are indicated by dashed lines 91 and 93 in FIG. 9). As is apparent here, the upper side of the guide shoe 31, provided for interacting with the sliding surface 33 of the axial piston pump, is machined in such a way that bearing regions 6 in the form of adjoining circular rings are formed from the coating 24 on the circumferential region of the upper side 95.

While various embodiments have been chosen to illustrate the invention, it will be understood by those skilled in the art that various changes and modifications can be made therein without departing from the scope of the invention as defined in the claims.

The invention claimed is:

1. A method of forming a coated control plate of an axial pump, comprising the steps of:
   providing a blank in the form of a circular disk having a central orifice and an annular recess radially between an axially projecting outer circumferential edge and an axially projecting annular rib surrounding the central orifice, the recess deepening consistently in a radially outward direction from the annular rib to the circumferential edge;
   filling the recess with a powdery coating material;
   melting the coating material under a protective gas atmosphere;
   cooling the coating material after the melting to solidify the coating material; and
   removing material by machining the blank with the coating material after the cooling to form a bearing surface from the coating material.

2. A method according to claim 1 wherein
   the powdery coating material filling the recess comprises a powdery tin bronze of CuSn6 to form a bronze layer coating on the bearing surface.

3. A method according to claim 1 wherein
   the blank is made of steel.

4. A method according to claim 1 wherein
   the melting is carried out in a vacuum furnace.

5. A method according to claim 1 wherein
   the melting brings the blank to a tempered state.

6. A method according to claim 1 wherein the blank is a tempered steel blank.

7. A method of forming a coated control plate of an axial pump, comprising the steps of:
   providing a steel blank in the form of a circular disk having a central orifice and an annular recess radially between an axially projecting outer circumferential edge and an axially projecting annular rib surrounding the central orifice, the recess deepening consistently in a radially outward direction from the annular rib to the circumferential edge;
   filling the recess with a powdery tin bronze of CuSn6 coating material;
   melting the coating material under a protective gas atmosphere;
   cooling the coating material after the melting to solidify the coating material; and
   removing material by machining the blank with the coating material after the cooling to form a bronze bearing surface from the coating material.

8. A method according to claim 7 wherein
   the melting is carried out in a vacuum furnace.

9. A method according to claim 7 wherein
   the melting brings the blank to a tempered state.

10. A method according to claim 7 wherein
    the blank is a tempered steel blank.

* * * * *